United States Patent
Horwatt

(10) Patent No.: US 6,326,422 B1
(45) Date of Patent: Dec. 4, 2001

(54) RADIATION CURABLE WIRE AND CABLE INSULATION COMPOSITIONS

(75) Inventor: Steven W. Horwatt, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/542,961

(22) Filed: Apr. 3, 2000

(51) Int. Cl.$^7$ .................. C08K 5/3445; C08K 5/541; C08K 5/5425; C08L 33/08; C08L 31/04

(52) U.S. Cl. .................. 524/93; 524/261; 524/264; 524/560; 524/563

(58) Field of Search .................. 524/261, 264, 524/560, 563, 93; 523/137, 173

(56) References Cited

U.S. PATENT DOCUMENTS

| | | |
|---|---|---|
| 2,997,456 | 8/1961 | Mills . |
| 3,218,276 | 11/1965 | Ringwald et al. . |
| 3,832,326 | 8/1974 | North et al. . |
| 3,922,442 | 11/1975 | North et al. . |
| 4,260,661 | 4/1981 | Walters et al. . |
| 4,349,605 | 9/1982 | Biggs et al. . |
| 4,381,362 | 4/1983 | Biggs et al. . |
| 4,407,992 | * 10/1983 | Keogh ............... 524/94 |
| 4,456,654 | * 6/1984 | Kotian ............... 428/383 |
| 4,459,380 | 7/1984 | Vostovich . |
| 4,693,937 | 9/1987 | Wu et al. . |
| 4,704,596 | * 11/1987 | Coffey et al. ........ 338/214 |
| 4,797,323 | 1/1989 | Wu et al. . |
| 4,808,643 | 2/1989 | Lemoine et al. . |
| 4,824,883 | 4/1989 | Walters et al. . |
| 4,857,673 | * 8/1989 | Wilkus et al. ....... 174/110 PM |
| 5,196,462 | 3/1993 | Berta . |
| 5,412,012 | * 5/1995 | Horwatt et al. ..... 524/265 |
| 5,482,990 | * 1/1996 | Jow et al. ........... 524/436 |
| 5,955,525 | * 9/1999 | Sanchez et al. ..... 524/264 |
| 6,096,816 | * 8/2000 | Kuckro .............. 524/405 |

OTHER PUBLICATIONS

Itzkoff, M.L., et al.: "Crosslinkable Polyethylene for Wire and Cable: An Update," *Wire Journal International*, pp 60–71 (May, 1982).

Gielenz, G., et al.: "Sucessfully Establishing E–Beam Crosslinking Process Conditions for the Wire and Cable Industry," *Wire Journal International*, pp 132–136, (March, 1997).

Datta, S.K. et al.: "Effect of Electron Beam Radiation on Structural Changes of Trimethylol Propane Trimethacrylate, Ethylene Vinyl Acetate and Their Blends," *J. of App. Polymer Sci.*, vol. 60: 1329–1341 (1996).

Roberts, B.E., et al.: "Industrial Applications of Different Methods of Crosslinking Polyethlene," *Plastics and Rubber Processing and Applications*, vol. 4: 135–139 (1984).

Novakovic, L, et al.: "Irradiation Effect on Polyethylene in the Presence of An Antioxidant and Trifunctional Monomers," *Polymer Degradation and Stability*, vol. 50: 53–58 (1995).

* cited by examiner

Primary Examiner—Vasu Jagannathan
Assistant Examiner—Callie E. Shosho
(74) Attorney, Agent, or Firm—Gerald A. Baracka; William A. Heidrich

(57) ABSTRACT

Compositions useful for coating wire and cable to provide a radiation curable insulation layer are provided. The improved compositions of the invention, when cured, have a balance of properties making them suitable for automotive and appliance wire applications. The compositions are comprised of an ethylene copolymer, a hydrated inorganic filler, an alkoxysilane and a zinc salt of a mercaptobenzimidazole compound.

17 Claims, No Drawings

RADIATION CURABLE WIRE AND CABLE INSULATION COMPOSITIONS

BACKGROUND OF THE INVENTION

1. Field of the Invention

The invention relates to polymeric compositions useful as insulation for wire and cable products used for underhood automotive applications or 125° C. rated appliance wire applications. More specifically, the compositions of the invention are ethylene-vinyl ester copolymer formulations with improved irradiation crosslinkability.

2. Detailed Description of the Prior Art

Polymeric compositions exhibiting a balance of physical properties, processability and flame retardance comprised of crosslinkable ethylene-vinyl acetate copolymers, silanes and hydrated inorganic filler(s) are known and have found wide acceptance in the wire and cable industry. Such compositions are disclosed in U.S. Pat. Nos. 3,832,326 and 3,922,442 to North, et al., and U.S. Pat. Nos. 4,349,605 and 4,381,362 to Biggs, et al. Besides the polymer, silane and hydrated filler, the formulations typically also contain other additives such as stabilizers, lubricants, antioxidants and the like.

To achieve useful wire and cable insulation compositions having the necessary balance of physical properties and thermal and chemical resistance, it is necessary that the compositions be crosslinked. This can be accomplished using chemical crosslinking agents, typically organic peroxides, or by exposing the composition to ionizing radiation.

Irradiation crosslinking has had limited commercial acceptance in the wire and cable industry. Contributing to this lack of commercial acceptance is the reduced crosslinking efficiency obtained with stabilized formulations. It is well known that the commonly used phenolic antioxidants reduce radiation crosslinking efficiency to generally unacceptable levels and, if the necessary degree of crosslinking is to be achieved in formulations containing such stabilizers, it is necessary to include a promotor. Useful promotors are typically multifunctional compounds, e.g., multifunctional acrylates and methacrylates.

It would be highly advantageous if wire and cable formulations were available which could be radiation crosslinked to achieve acceptable levels of cure without the use of multifunctional promotors. It would be even more advantageous if these compositions had acceptable balance of properties making them suitable for low tension primary cable applications. These and other objectives are realized with the improved compositions of the invention which incorporate a zinc salt of a mercaptobenzimidazole compound.

Benzimidazole compounds are known stabilizers for thermoplastic resins such as polyethylenes and polypropylene. U.S. Pat. No. 3,218,276 discloses the use of alkyl benzimidazoles to stabilize fiber-forming polyolefins. Polypropylene fiber-forming compositions containing 0.2 to 2.0 percent benzimidazole with other conventional additives are disclosed.

U.S. Pat. No. 2,997,456 teaches the use of metallic mercaptobenzimidazole compounds as stabilizers for polymers of 1-olefins, primarily polypropylene, to protect against molecular degradation under conditions of elevated temperature and/or mechanical working and zinc mercaptobenzimidazole is specifically mentioned.

The combination of hindered phenols with various zinc salts of mercapto compounds to stabilize polyolefins is taught in U.S. Pat. Nos. 4,260,661; 4,693,937; 4,797,323 and 4,824,883. Other references which disclose benzimidazole stabilizers for polymeric materials include U.S. Pat. Nos. 4,459,380; 4,808,643 and 5,196,462.

SUMMARY OF THE INVENTION

The improved radiation curable wire and cable insulation compositions of the invention contain (a) 35 to 60 weight percent of a copolymer of ethylene and a vinyl carboxylate, alkyl acrylate or alkyl methacrylate, (b) 40 to 65 weight percent of a hydrated inorganic filler, (c) 0.25 to 2 weight percent of an alkoxysilane wherein the alkoxy group has from 1 to 6 carbon atoms and (d) 0.5 to 5 weight percent zinc salt of a mercaptobenzimidazole.

In a preferred embodiment (a) is an EVA copolymer, (b) is ATH, (c) is a vinylalkoxysilane and (d) is ZMTI. It is even more advantageous for certain wire and cable applications when the composition contains 40 to 55 weight percent (a) having a melt index from 0.3 to 5 g/10 min, 45 to 65 weight percent (b), 0.5 to 1.5 weight percent (c), and 1 to 4 weight percent (d).

Wire and cables coated with the above-defined compositions and irradiated utilizing e-beam or other conventional radiation sources to effect cure, i.e., crosslinking, are also embodied herein. The compositions are particularly useful for fabricating low tension primary wire and cable as defined by SAE Standard J1128.

DETAILED DESCRIPTION

The present invention relates to improved radiation curable insulating compositions comprising copolymers of ethylene and a vinyl carboxylate or alkyl acrylate or methacrylate, a silane, a hydrated inorganic filler, and a zinc salt of a mercaptobenzimidazole compound. These compositions can be cured to acceptable levels without the use of multifunctional promotors and, as a result, are useful for insulating wire and cable.

The polymeric component used to obtain the radiation crosslinkable compositions of the invention, also referred to as the base resin, is a copolymer of ethylene and a functionalized comonomer which may be a vinyl ester or an alkyl acrylate, the latter being used in the generic sense to encompass alkyl esters of both acrylic and methacrylic acid. The vinyl carboxylate may be a vinyl ester of a $C_2$–$C_6$ aliphatic carboxylic acid, such as vinyl acetate, vinyl propionate, vinyl butyrate, vinyl pentanoate or vinyl hexanoate. The acrylates may be any of the $C_1$–$C_6$ alkyl esters of acrylic or methacrylic acid including, for example, methyl, ethyl, propyl, butyl, pentyl or hexyl acrylate or methacrylate.

Preferred copolymers for the compositions of the invention are ethylene-vinyl acetate (EVA) copolymers containing about 9% to about 45% and, more preferably, 9% to about 30%, vinyl acetate, with the balance being ethylene. Terpolymers of ethylene, vinyl acetate and other known olefinic monomers polymerizable therewith can also be employed. Generally, if a third monomer is present, it will constitute no more than about 15% of the polymer composition.

Copolymers of ethylene and butyl acrylate are another useful type of base resin which can be used to formulate the improved compositions of the invention. Useful ethylene-butyl acrylate (EBA) copolymers contain about 10% to about 45% and, more preferably, 20% to 40% butyl acrylate—the balance being ethylene. n-Butyl acrylate is a preferred comonomer.

Blends of EVA and EBA, particularly where EVA comprises the major component of the blend, can also be used. The EVA will generally constitute greater than 75% of such blends. It is also possible to include minor amounts of other crosslinkable polymers or copolymers in the composition of this invention; however, the ethylene copolymer should comprise at least 50% of the total base resin component. Representative of such minor polymeric components which can be used in such embodiments include polyethylene, polypropylene, ethylene-propylene copolymers and terpolymers, and the like. Low density polyethylene (LDPE) and linear low density polyethylene (LLDPE) having melt indexes from 0.5 to 5 provide particularly desirable blends when used in amounts of 30% or less, based on the total polymers comprising the base resin component.

The ethylene copolymer or ethylene copolymer blend comprising the base resin generally has a melt index (MI) in the range 0.1 to 10 g/10 min and, more preferably, from 0.3 to 5 g/10 min. Melt index figures are equivalent values correlated from the melt flow rates determined in accordance with ASTM D 1238.

Fillers used for the present invention are hydrated inorganic fillers, e.g., hydrated aluminum oxides ($Al_2O_3 3H_2O$ or $Al(OH)_3$), hydrated magnesia, hydrated calcium silicate, hydrated magnesium carbonates, or the like. Hydrated alumina (ATH) is most commonly employed. Water of hydration chemically bound to these inorganic fillers is released endothermically upon combustion or ignition of the ethylene copolymer to impart flame retardance. Minor amounts of other types of fillers may also be present. The filler size should be in accordance with those sizes used by the prior art.

A silane is also included in the compositions of the invention. Alkoxy silanes which do not adversely affect the desired balance of properties and which facilitate binding the polymer and inorganic filler can be used provided they do not degrade during processing or otherwise interfere with crosslinking. Mixtures of alkoxy silanes can be employed.

Alkoxysilanes used for this purpose include lower alkyl-, alkenyl-, alkynyl-, and aryl-alkoxysilanes containing from 1 to 3 alkoxy substituents having from 1 to 6 and, more preferably, 1 to 3 carbon atoms. Alkoxysilanes having 2 or 3 $C_{1-3}$ alkoxy substituents, e.g. methoxy, ethoxy, propoxy or combinations thereof, are particularly advantageous. Illustrative silanes include methyltriethoxysilane, methyltris(2-methoxyethoxy)silane, dimethyldiethoxysilane, ethyltrimethoxysilane, vinyltris(2-methoxyethoxy)silane, phenyltris(2-methoxyethoxy)silane, vinyltrimethoxysilane and vinyltriethoxysilane, and gamma-methacryloxypropyltrimethoxysilane. It is preferred to use vinyl alkoxysilanes and vinyltrimethoxysilane (VTMOS) and vinyltriethoxysilane (VTEOS) are particularly advantageous.

A zinc salt of a mercaptobenzimidazole having the formula

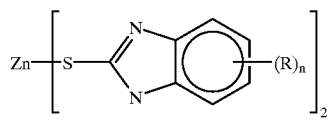

where R is a $C_{1-4}$ alkyl group and n is 0 to 4 is employed. Zinc mercaptobenzimidazole compounds provide effective stabilization and also unexpectedly provide acceptable radiation curability without the use of multifunctional promotor compounds. The enhanced crosslinking efficiency and resulting balance of properties achieved therewith makes the compositions of the invention useful for wire and cable insulation applications, particularly for low tension primary cable intended for use at a nominal system voltage of 60V DC or less in surface vehicle electrical systems.

Zinc salts of mercaptobenzimidazoles where n is 0 or 1 and particularly those where R is methyl are especially useful for the invention. Zinc 2-mercaptobenzimidazole (ZMB) and zinc 2-mercaptotolylimidazole (ZMTI) are particularly advantageous and are commercially available.

Compositions of the invention contain 35 to 60 weight percent of the base resin, 40 to 65 weight percent hydrated inorganic filler, 0.25 to 21 weight percent silane and 0.5 to 5 weight percent of the zinc mercaptobenzimidazole compound. All of the above percentages are based on the total weight of the composition. If desired, one or more other additives which do not interfere with radiation crosslinkability can be included in the formulation.

For example, processing aids, i.e., lubricants, are commonly included in compositions used to extrusion coat wire and cable. Such processing aids not only improve processability but also improve surface quality and strippability of the wire or cable insulation. Conventional processing aids which can be utilized for this purpose include fatty acids and fatty acid soaps such as calcium stearate, aluminum stearate, silicone oils, long chain aliphatic amides, natural and synthetic hydrocarbon waxes, low molecular weight polyethylene waxes, fluoroelastomers, low molecular weight aliphatic resins and the like. One highly useful lubricant combination disclosed in U.S. Pat. No. 4,349,605 is a mixture of lauric acid and ethylene-bis-steraramide.

In addition to the foregoing, other additives may also be included such as carbon black, pigments and the like provided they do not interfere with crosslinking or otherwise detract from the physical properties of the crosslinked compositions. The total amount of additives will generally not exceed 10 weight percent and, more commonly, the total additives content is less than 7.5 weight percent.

In a preferred embodiment of the invention where radiation crosslinkable compositions useful for wire and cable insulation applications are prepared, the compositions are comprised of 40 to 55 weight percent base polymer, 45 to 60 weight percent hydrated inorganic filler, 0.5 to 1.5 weight percent silane and 1 to 4 weight percent zinc salt of a mercaptobenzimidazole. In an even more preferred embodiment, the base resin will be EVA or an EVA/EBA blend, the hydrated inorganic filler is ATH, the silane is VTMOS or VTEOS and the zinc mercaptobenzimidazole compound is ZMB or ZMTI.

The ingredients can be combined with the base resin separately or added as a mixture or masterbatch; however, it is particularly advantageous when the silane is added to the base resin and blended before addition of the hydrated filler and other additives. The base resin and ingredients are blended in a mixer or the like. Mixers capable of imparting high shear such as Banbury mixers, Farrel continuous mixers, Boiling Mixtrumat™ mixers or Werner & Pfleiderer mixers are most commonly used.

Formulations prepared in accordance with the invention are extruded and radiation crosslinked in accordance with conventional procedures known to the art, such as disclosed by Itzkoff, et al., *Wire Journal International*, pp. 60–71 (May, 1982), details of which are incorporated herein by reference.

The irradiation crosslinkable compositions of the invention are highly useful as insulating coatings for metal conductors—especially 1 to 30 AWG copper and aluminum, single or multi-strand wire or cable. The compositions are typically applied by extruding a substantially uniform 2 to 100 mil thick layer onto the metal conductor. More typically, insulation thickness will range from 10 to 60 mils. The compositions are especially useful for the manufacture of wire for automotive underhood applications and for 125° C. rated wire applications. Insulated wires coated with compositions produced in accordance with the invention meet all of the requirements of SAE Standard J1128 for low tension primary cable. This standard is intended to qualify cables designed for use at nominal voltages of 60V DC or less in normal applications with limited exposure to fluids and physical abuse such as in surface vehicle electrical systems.

The polymer compositions may also be used for other applications. For example, they can be extruded onto pipes and conduits for electrical and other applications. They can also be coextruded with one or more other thermoplastic materials to produce useful laminated constructions. Powders of these resins may be applied as coatings to either interior or exterior surfaces utilizing conventional powder coating procedures.

Various aspects of the invention are described in greater detail in the examples which follow. These examples are for illustration purposes only and are not intended to limit the invention. Numerous variations are possible without deviating from the spirit and scope of the invention and will be apparent to those skilled in the art. All percentages and ratios are on a weight basis unless otherwise indicated.

Formulations in the examples were obtained by adding the ingredients to a Banbury mixer and mixing until the temperature reached 121° C.—usually about 2½ to 3 minutes. The product was then dropped from the mixer and sheeted on a two-roll mill at a temperature of 104° C. to 110° C. Plaques were used to evaluate crosslinkability. The 20 mil thick plaques were compression molded at 149° C. for 10 minutes at 1400 psi and then irradiated using a conventional e-beam source to effect cure. All samples were irradiated at 7.5 Mrads and then measured for gel content. Percent gel was determined by extracting in boiling xylene in accordance with ASTM D2765-84, Method C.

Compositions as set forth in the table which follows were prepared and irradiated in accordance with the above-described procedures and gel contents determined. Product I was a composition of the invention and Products II–V are provided for comparative purposes.

| Prod. No. | I | II | III | IV | V |
|---|---|---|---|---|---|
| EVA[1] | 44.70 | 44.70 | 44.60 | 44.01 | 43.82 |
| ATH | 52.75 | 52.75 | 52.63 | 51.94 | 51.71 |
| VTMOS | 0.76 | 0.76 | 0.76 | 0.75 | 0.74 |
| ZMTI | 1.79 | — | — | — | — |
| MTI[2] | — | 1.79 | — | — | — |
| Hindered Phenol Stabilizer | — | — | — | 1.32[4] | 1.75[5] |
| Promotor[3] | — | — | 2.00 | 1.98 | 1.97 |
| % Gel | 82.5 | 72.1 | 81.5 | 73.1 | 65.9 |

[1]2 MI; vinyl acetate content 18%
[2]2-Mercaptotolylimidazole
[3]Trimethylolpropane trimethacrylate
[4]A 2:1 mixture of pentaerythrityl tetrakis[3(3',5'-di-t-butyl-4'-hydroxyphenyl)propionate] and distearylthiodipropionate
[5]A 1:1 mixture of pentaerythrityl tetrakis[3(3',5'-di-t-butyl-4'-hydroxyphenyl)propionate] and thiodiethylene bis(3,5-di-t-butyl-4-hydroxyhydrocinnamate).

The inventive composition (Product I) had a gel content of 82.5 percent which is generally considered acceptable for wire and cable applications and indicative of cures comparable to those which can be achieved utilizing chemical, i.e., peroxide, cure systems. Gel contents of 80 percent or greater are considered to be necessary. At these cure levels, it is generally considered that optimal physical properties are realized. In addition to the high level of cure achieved with Product I, the composition had good processing characteristics and was readily extrudable onto copper wire using conventional extrusion equipment.

Comparative Product II, which was identical in all respects to Product I except that MTI was utilized rather than the zinc salt, only had a gel level of 72.1 percent which is regarded as being unacceptable. This demonstrates the unexpected advantage associated with the use of the zinc salts of the mercaptobenzimidazole compounds.

Comparative Products III, IV and V demonstrate the adverse affect of hindered phenols on radiation cure and the inability to achieve acceptable gel contents when conventional phenolic stabilizer systems are employed. Product III shows that it is possible to obtain acceptable cure, i.e., gel content greater than 80 percent, using a promotor in the absence of a hindered phenol; however, the thermooxidative resistance of the resulting product would be unacceptable since it contains no stabilizer. When conventional hindered phenolic stabilizer packages are included with the promotor, as with Products IV and V, the cure is adversely affected and gel contents are reduced to unacceptably low levels. Only with Product I is it possible to achieve both acceptable radiation cure and acceptable properties of the resulting cured article under these conditions.

An additional unexpected advantage observed with the compositions of the invention is a marked improvement in flame retardance. Whereas Product V had an extinguishing time of 241 seconds when evaluated for flame retardance in accordance with SAE J1128, section 6.6, the composition of the invention (Product I) had an extinguishing time of only 18 seconds. Thus, in addition to the enhanced radiation curability, a more than 10-fold improvement in flame resistance is achieved by the use of the inventive composition versus a conventional stabilized/promoted composition.

Product I was extruded onto copper wire using a conventional continuous extrusion line to produce a TXL type cable construction. A 16 mil thick insulation layer was applied onto 22 gauge 7-strand copper wire and the coated wire cured by irradiating using an e-beam source at 7.5 Mrads. The insulated wire had a smooth, uniform surface and met all of the requirements of SAE J1128. For example, sandpaper abrasion resistance (section 6.10) and pinch resistance (section 6.9) values were 527 nm and 1.7 kg., respectively, well within the specified standards.

I claim:

1. A radiation cured insulation composition having a gel content of 80% or greater determined in accordance with ASTM D2765-84, Method C, consisting essentially of 35 to 60 weight percent of an ethylene copolymer selected from the group consisting of ethylene-vinyl acetate copolymer and ethylene-butyl acrylate copolymer; 40 to 65 weight percent of a hydrated inorganic filler; 0.25 to 2 weight percent of an alkoxysilane wherein the alkoxy group has from 1 to 6 carbon atoms; and 0.5 to 5 weight percent zinc salt of a mercaptobenzimidazole.

2. The composition of claim 1 wherein the zinc mercaptobenzimidazole salt has the formula

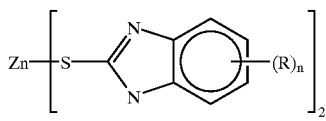

where R is a $C_{1-4}$ alkyl group and n 0 to 4.

3. The composition of claim 2 wherein R is methyl and n is 0 or 1.

4. The composition of claim 3 wherein the zinc mercaptobenzimidazole compound is zinc 2-mercaptotolylimidazole.

5. The composition of claim 1 wherein the ethylene copolymer has a melt index from 0.1 to 10 g/10 min.

6. The composition of claim 5 wherein the ethylene copolymer is an ethylene-vinyl acetate copolymer containing 9 to 30 percent vinyl acetate and having a melt index from 0.3 to 5 g/10 min.

7. The composition of claim 5 wherein the ethylene copolymer is an ethylene-butyl acrylate copolymer containing 20 to 40 percent n-butyl acrylate and having a melt index from 0.3 to 5 g/10 min.

8. The composition of claim 1 wherein the hydrated inorganic filler is hydrated alumina.

9. The composition of claim 1 wherein the alkoxysilane is a lower alkyl-, alkenyl-, alkynyl- or aryl-alkoxysilane having from 1 to 3 alkoxy substituents containing from 1 to 3 carbon atoms.

10. The composition of claim 9 wherein the alkoxysilane is a vinylalkoxysilane.

11. The composition of claim 10 wherein the vinylalkoxysilane is vinyltrimethoxysilane.

12. The composition of claim 1 containing 40 to 55 weight percent ethylene copolymer, 45 to 60 weight percent hydrated inorganic filler, 0.5 to 1.5 weight percent alkoxysilane and 1 to 4 weight percent zinc mercaptobenzimidazole compound.

13. A radiation cured insulation composition having a gel content of 80% or greater determined in accordance with ASTM D2765-84, Method C, consisting essentially of 40 to 55 weight percent ethylene-vinyl acetate copolymer having a melt index from 0.3 to 5 g/10 min; 45 to 60 weight percent hydrated alumina; 0.5 to 1.5 weight percent vinylalkoxysilane containing from 2 to 3 $C_{1-3}$ alkoxy groups; and 1 to 4 weight percent zinc 2-mercaptotolylimidazole.

14. A radiation cured extrusion coated article comprising a wire or cable substantially uniformly coated with a 2 to 100 mil thick insulation layer consisting essentially of 35 to 60 weight percent of an ethylene copolymer selected from the group consisting of ethylene-vinyl acetate copolymer and ethylene-butyl acrylate copolymer; 40 to 65 weight percent of a hydrated inorganic filler, 0.25 to 2 weight percent of an alkoxysilane wherein the alkoxy group has from 1 to 6 carbon atoms; and 0.5 to 5 weight percent zinc salt of a mercaptobenzimidazole, said radiation cured insulation layer having a gel content of 80% or greater determined in accordance with ASTM D2765-84, Method C.

15. The article of claim 14 wherein the insulation layer comprises 40 to 55 weight percent of an ethylene-vinylacetate copolymer having a melt index from 0.3 to 5 g/10 min; 45 to 60 weight percent hydrated alumina; 0.5 to 1.5 weight percent vinylalkoxysilane containing from 2 to 3 $C_{1-3}$ alkoxy groups; and 1 to 4 weight percent zinc 2-mercaptotolylimidazole.

16. The article of claim 15 wherein 1 to 30 AWG copper wire is coated with a 10 to 60 mil thick insulation layer.

17. The article of claim 16 which is a low tension primary cable.

* * * * *